United States Patent
Ren et al.

(10) Patent No.: US 8,433,319 B2
(45) Date of Patent: *Apr. 30, 2013

(54) SYSTEMS AND METHODS FOR CHANNEL SELECTION MANAGEMENT IN A WIRELESS COMMUNICATION NETWORK

(75) Inventors: Fang-Ching Ren, Hsinchu (TW); Ray-Guang Cheng, Taipei (TW); Chie-Ming Chou, Taichung County (TW); Kun-Ying Hsieh, Tainan (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 1206 days.

This patent is subject to a terminal disclaimer.

(21) Appl. No.: 11/970,511

(22) Filed: Jan. 7, 2008

(65) Prior Publication Data

US 2008/0171553 A1 Jul. 17, 2008

Related U.S. Application Data

(60) Provisional application No. 60/880,313, filed on Jan. 12, 2007, provisional application No. 60/902,517, filed on Feb. 22, 2007.

(51) Int. Cl.
 *H04W 36/00* (2009.01)
 *H04M 1/00* (2006.01)
(52) U.S. Cl.
 USPC ............ 455/436; 455/437; 455/524; 455/525
(58) Field of Classification Search .................. 455/436, 455/437, 524, 525
 See application file for complete search history.

(56) References Cited

U.S. PATENT DOCUMENTS

| | | | |
|---|---|---|---|
| 6,064,890 A * | 5/2000 | Hirose et al. | 455/513 |
| 6,161,014 A | 12/2000 | Girardeau et al. | |
| 2005/0096053 A1 | 5/2005 | Liu et al. | |

FOREIGN PATENT DOCUMENTS

| | | |
|---|---|---|
| EP | 0 615 391 A | 9/1994 |
| WO | WO 99/27747 | 6/1999 |
| WO | WO 01/19100 | 3/2001 |

OTHER PUBLICATIONS

Communication from European Patent Office for European Application No. 08100313.9, Sep. 16, 2009.
European Search Report for European Application No. 08100313.9, European Patent Office, Jun. 10, 2008.

(Continued)

*Primary Examiner* — Kamran Afshar
*Assistant Examiner* — Omoniyi Obayanju
(74) *Attorney, Agent, or Firm* — Finnegan, Henderson, Farabow, Garrett & Dunner, LLP

(57) ABSTRACT

A system for channel selection management in a wireless communication network. The system includes a memory module configured to store at least one channel condition related to at least one infrastructure station among a plurality of infrastructure stations in the wireless communication network, wherein each of the plurality of infrastructure stations is able to monitor a channel condition of a channel between the each infrastructure station and a mobile station; a compare module configured to compare a channel condition related to one of the plurality of infrastructure stations with a threshold and provide a signal for a comparison result; a control module configured to provide a control information based on the signal from the compare module; and a selection module configured to select one of the at least one infrastructure station and notify the selected infrastructure station to serve the mobile station based on the control information from the control module.

20 Claims, 7 Drawing Sheets

OTHER PUBLICATIONS

Baum et al., Singling for Efficient Routing, IEEE 802.16j Multihop Relay Task Group Project, Nov. 7, 2006.

Koo et al., Enhanced Handover Mechanism for Supporting Active BS Set in IEEE P802.16e/D1-2004, IEEE 802.16 Broadband Wireless Access Working Group Project, Mar. 5, 2004.

Nourizadeh et al., Impact of the Inter-relay Handoff on the Relaying System Performance, Vehicular Technology Conference, 2006.

Communication from European Patent Office for European Application No. 08100313.9, Dec. 6, 2010.

* cited by examiner

SYSTEMS AND METHODS FOR CHANNEL SELECTION MANAGEMENT IN A WIRELESS COMMUNICATION NETWORK

CROSS-REFERENCE TO RELATED APPLICATIONS

This application claims the benefits of U.S. Provisional Application No. 60/880,313, filed Jan. 12, 2007 and U.S. Provisional Application No. 60/902,517, filed Feb. 22, 2007.

BACKGROUND OF THE INVENTION

The present invention relates to methods and systems for wireless communications. More particularly, the present invention relates to methods and systems for channel selection management in a wireless communication network.

Wireless communications may play an important role in the exchange of audio, video or other information, which may be communicated in the form of data. To extend the coverage of a base station in a wireless communication network, relay stations subordinate to the base station may be provided to forward signals between the base station and a mobile station. However, limitation on transmission capacity of the relay stations may limit throughput of data or amount of data exchanged within a time period. Also, as the mobile station moves within the coverage of an infrastructure station such as the base station or the relay station, it may be necessary to switch its access station from the one infrastructure station to another infrastructure station.

In wireless communications, control information, such as that for allocating wireless communication resources or controlling other aspects of data exchange between two or more stations, may be transmitted together with actual data. In some applications, the need for a base station or a relay station to process or handle the control information, which may be transmitted in the form of a control message, may consume additional resources and further limit the transmission capacity or throughput available for the actual data.

A so-called "transparent relay station (transparent RS)" may therefore be applied to enhance the transmission capacity or the throughput available for the actual data. A transparent RS may refer to an RS that does not transmit its own control information or control message on a broadcast connection when downlink accessing its attached mobile stations. As a result, the transparent RS may reduce the operation and control overhead. Moreover, it may be possible for several infrastructure stations in a wireless communication network such as a multi-hop relaying network to share the same broadcast information such as the control information on synchronization or resources allocation so that a mobile station may communicate with one of the infrastructure stations without initiating any handover or being aware of any change of its access station from one transparent RS to another transparent RS when the mobile station migrates in coverage from one transparent RS to another. However, additional mechanism may be required for maintaining connectivity between the mobile station and one of the infrastructure stations. A so-called channel selection management in, for example, a handover process or the change of an access station from one transparent RS to another, may be necessary in the wireless communication network.

FIG. 1 is a diagram of an exemplary wireless communication network. The wireless communication network may include a base station (BS) 102, a relay station (RS) 104 and a mobile station (MS) 106. The base station 102 may be an access station for the relay station 104 and the mobile station 106, and the relay station 104 may be an access station for the mobile station 106. Specifically, the base station 102 may be configured to transmit base-station data to and receive mobile-station data from the mobile station 106. Furthermore, the base station 102 may be configured to transmit the base-station data to and receive relay-station data from the relay station 104. The base station 102 may also be configured to transmit control information or a control message to the relay station 104 and the mobile station 106. The relay station 104 may be configured for relaying at least a portion of the base-station data, and the mobile station 106 may be configured to receive the base-station data and/or the relay-station data and transmit the mobile station-data. The mobile station 106 may also be configured to receive the control information from the base station 102 without any intermediate relay station such as the relay station 104 for relaying the control information. That is, the relay station 104 is "transparent" to the mobile station 106.

In some examples, the mobile station 106 may be configured to receive the base-station data and transmit the mobile-station data through one or more relay stations. The control information may include one or more resource allocation information, a control message "MAP", ranging response message "RNG-RSP" and/or a connection identification (CID) assignment, depending on its applications. Additionally, the mobile station 106 may be configured to respond to the control information with an initial ranging code and a ranging request message "RNG-REQ", depending on its applications.

In some prior art methods, channel selection management may be achieved by maintaining a candidate set of infrastructure stations and selecting an infrastructure station from the candidate set as a next access station for the mobile station before switching the mobile station's access station or performing a handover, either soft handover acquired for better macro-diversity gain or hard handover for seamless switching. Examples of the prior art methods may include U.S. Pat. No. 6,714,788 to Voyer, entitled "Method of Reducing Base Station Overloading," U.S. Patent Application Publication No. 20060223535 by Das et al, entitled "Hard Handoff Procedure for Dedicated and High Speed Shared Channels," and U.S. Patent Application Publication No. 20060285520 by Venkitaraman, entitled "Method and Apparatus to Facilitate Handover." However, these prior art techniques for channel selection management may need periodic monitoring and reporting of scanning results of periodic measurement and evaluation of candidate stations in order to improve transmission capacity or enhance transmission efficiency in some applications. Consequently, in some applications the prior art methods or apparatuses in the examples might not be efficient enough or suitable for performing a seamless handover in a wireless communication based on transparent RSs. Furthermore, a mobile station may not perform a handover request if an access station to which the mobile station may switch is included in the candidate set of infrastructure stations. It may therefore be desirable to have a method or a system for channel selection management to facilitate or enhance handover for a mobile station.

BRIEF SUMMARY OF THE INVENTION

Examples of the present invention may provide a system for channel selection management in a wireless communication network, the system comprising a memory module configured to store at least one channel condition related to at least one infrastructure station among a plurality of infrastructure stations in the wireless communication network, wherein each of the plurality of infrastructure stations is able to monitor a channel condition of a channel between the each infrastructure station and a mobile station; a compare module configured to compare a channel condition related to one of the plurality of infrastructure stations with a threshold and provide a signal for a comparison result; a control module configured to provide a control information based on the signal from the compare module; and a selection module configured to select one of the at least one infrastructure station and notify the selected infrastructure station to serve the mobile station based on the control information from the control module.

Some examples of the invention may also provide a method for channel selection management in a wireless communication network, the method comprising storing at least one channel condition related to at least one infrastructure station among a plurality of infrastructure stations in the wireless communication network, wherein each of the plurality of infrastructure stations is able to monitor a channel condition of a channel between the each infrastructure station and a mobile station; providing a threshold for identifying whether a channel condition is acceptable, comparing a channel condition related to one of the plurality of infrastructure stations with the threshold; providing a signal for a comparison result; providing a control information based on the signal for the comparison result; and selecting one of the at least one infrastructure station to serve the mobile station based on the control information.

Examples of the invention may provide a method for channel selection management in a wireless communication network, the method comprising requesting each of at least one relay station to monitor a channel condition of a channel between the each relay station and a mobile station in the wireless communication network; sending a message from the each relay station to a base station to report a result of the monitoring; identifying whether the channel condition of the each relay station is acceptable based on the message from the each relay station; and selecting one of the at least one relay station and the base station to serve the mobile station.

Examples of the present invention may further provide a method for channel selection management in a wireless communication network, the method comprising providing a first relay station serving a mobile station in the wireless communication network, the first relay station reporting the channel condition of a channel between the first relay station and the mobile station; requesting each of at least one second relay station not serving the mobile station to monitor a channel condition of a channel between the each second relay station and the mobile station; sending a message from the each second relay station to a base station to report a result of the monitoring; identifying a channel condition of the each second relay station based on the message from the each second relay station; notifying the first relay station to cease to serve the mobile station; and notifying one of the at least one second relay station to serve the mobile station.

It will be appreciated by those skilled in the art that changes could be made to the examples described above without departing from the broad inventive concept thereof. It is understood, therefore, that this invention is not limited to the particular examples or embodiments disclosed, but it is intended to cover modifications within the spirit and scope of the present invention.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples consistent with the invention. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

In examples consistent with the present invention, some or all of control information may be handled directly by a base station without consuming resources of relay stations in a wireless communication network. In some examples, to increase data throughput, the relay stations may be configured to serve as transparent relay stations and therefore may not process some or all of the control information. In other examples, the relay stations may be configured not to monitor radio channels and the base station may be configured not to prepare or process control information or messages related to relaying data between the base station and the mobile station, thereby reducing the complexity in data accessing or processing at both of the base station and the relay stations.

Figure 1:
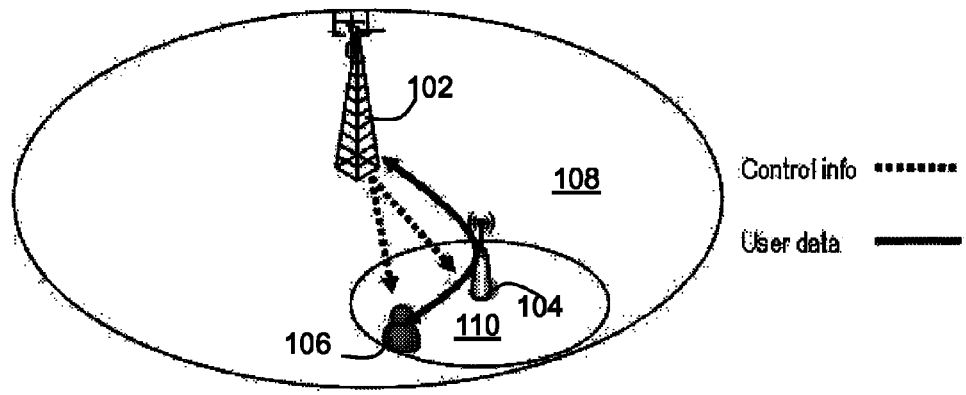
FIG. 1 is a diagram of an exemplary wireless communication network.
Figure 2:
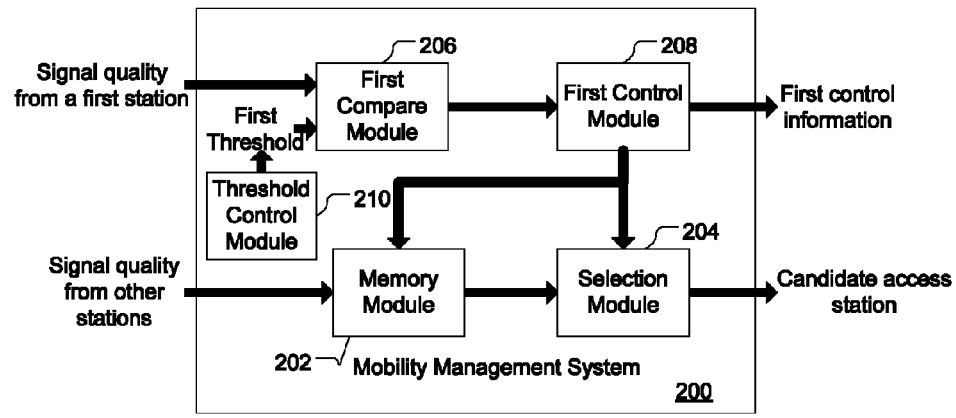
FIG. 2 is a diagram of a system for channel selection management according to an example of the present invention.

FIG. 2 is a diagram of a system 200 for channel selection management according to an example of the present invention. Referring to FIG. 2, the system 200 may include a memory module 202, a selection module 204, a first compare module 206 and a first control module 208. The system 200 as a whole or at least one of individual modules 202, 204, 206 or 208 may be implemented in hardware or software, in which the former may be more advantageous in view of operation speed while the latter may be more cost effective in view of design complexity. Either implemented in hardware or software, the system 200 in one example may be provided or installed in a base station.

The memory module 202 may be configured to store a table of channel conditions related to a set of infrastructure stations in a wireless communication network. The wireless communication network may include a plurality of infrastructure stations and a mobile station. The plurality of infrastructure stations, which comprises the set of infrastructure stations, may include one or more base station and one or more relay station. One of the set of infrastructure stations, for example, a first station, may access data with the mobile station or serve the mobile station. Each of the plurality of infrastructure stations may be capable of receiving a signal from the mobile station and measuring the quality of the signal, which may represent the channel condition of a link between the each infrastructure station and the mobile station. The selection module 204 may be configured to select one of the set of infrastructure stations and provide the selected one as a candidate access station for the mobile station. The first compare module 206 may be configured to compare the signal quality measured by the first station with a first threshold and generate a first result of comparison. Based on the first result, the first control module 208 may provide a first control information to the plurality of infrastructure stations. In one example, the first control information may include at least one of resource allocation information, a ranging response or connection identification (CID) assignment. In response to the first control information, in one example, if the signal quality measured by the first station does not reach the first threshold, each of the plurality of infrastructure stations may be requested to measure the signal quality of a signal transmitted from the mobile station over a link or channel to the each infrastructure station.

The signal quality of a signal from the mobile station may be identified by measuring, for example, the electrical characteristics of the signal such as signal to interference plus noise ratio (SINR), received signal strength indication (RSSI) and bit error rate (BER). The first threshold may therefore refer to a minimum SINR, minimum RSSI, or maximum BER for a barely acceptable channel condition. Furthermore, the expression "reaching the first threshold" throughout the specification may mean that the channel condition of the link between the mobile station and its current access station is acceptable. Specifically, "reaching the first threshold" may refer to a situation where a value equal to or greater than a predetermined SINR, a power level equal to or greater than a predetermined RSSI or a value smaller than a predetermined BER, is reached. The first control module 208 in one example may remain the first station in the set of infrastructure stations and update the channel condition of the first station in the memory module 202 based on the signal quality if the first result shows that the signal quality of the signal reaches the first threshold. The first control module 208 in another example may remove the first station and its associated channel condition from the memory module 202 if the first result shows that the signal quality of the signal does not reach the first threshold.

The table in the memory module 202 may also store communication information such as timing information, synchronization information or transmission power of each of the set of infrastructure stations. As the mobile station moves, the mobile station may need to switch from the current access station to another or perform a handover. When a handover is required, the selection module 204 may select a suitable station from the table for the mobile station, wherein a suitable station may refer to at least one that the signal quality of a signal from the mobile station is better than a predetermined threshold. Because the communication information stored in the memory module 202 may be available from the table and may be transmitted to the mobile station directly, conventional handover procedures may be eliminated. In this way, the transmission capacity of the infrastructure stations may be improved because less control information or control message are required for performing the switching or handover.

Figure 3:
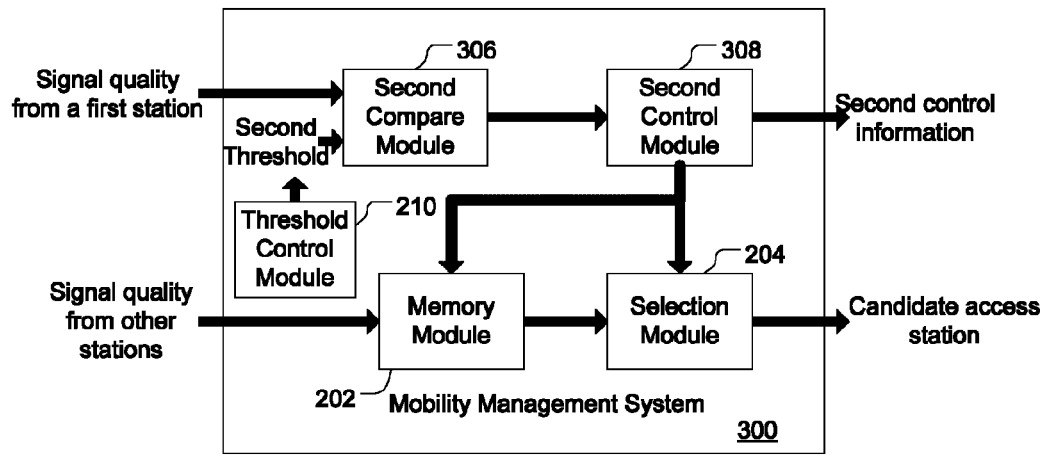
FIG. 3 is a diagram of a system for channel selection management according to another example of the present invention.

FIG. 3 is a diagram of a system 300 for channel selection management according to another example of the present invention. Referring to FIG. 3, the system 300 may be similar to the system 200 described and illustrated with reference to FIG. 2 except that, for example, a second compare module 306 and a second control module 308 replace the first compare module 206 and the first control module 208. The second compare module 306 may be configured to compare the signal quality measured by the first station with a second threshold and generate a second result of comparison. In the present example, each of the plurality of infrastructure stations as well as the first station may measure the signal quality of a signal transmitted from the mobile station over an individual link. Based on the second result, the second control module 308 may provide a second control information to the plurality of infrastructure stations. In one example according to the present invention, if the signal quality measured by the first station reaches the second threshold, which may mean that the channel condition of the first station is acceptable, in response to the second control information, each of the plurality of infrastructure stations may cease to measure the signal quality of the signal from the mobile station over the individual link. The second threshold in one example may include one or more of a predetermined SINR, RSSI or BER value for an acceptable channel condition. Furthermore, the second control information may include one or more of resource allocation information, a ranging response or connection identification (CID) assignment. Moreover, if each of the plurality of infrastructure stations continues to measure and report the signal quality of the signal from the mobile station over the individual link, the memory module 202 may also store communication information such as timing information, synchronization information or transmission power of each of the infrastructure stations.

Figure 4:
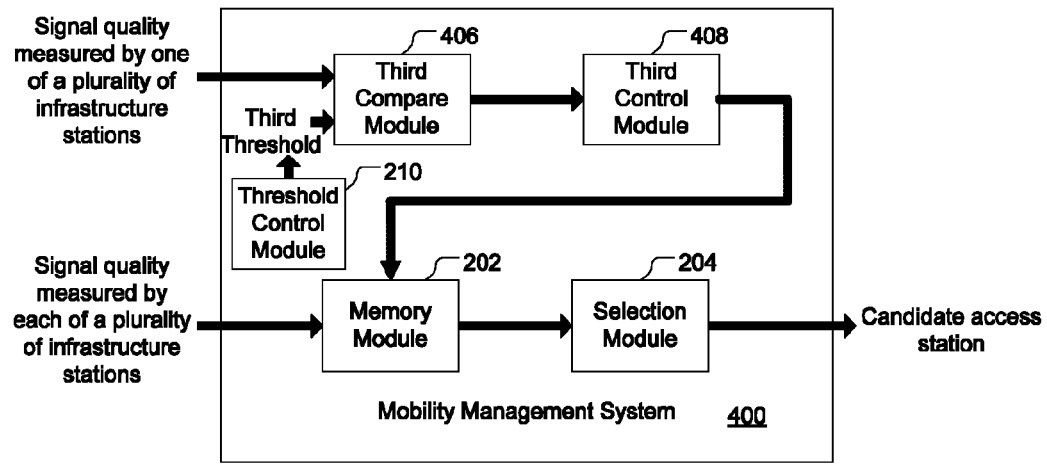
FIG. 4 is a diagram of a system for channel selection management according to still another example of the present invention.

FIG. 4 is a diagram of a system 400 for channel selection management according to still another example of the present invention. Referring to FIG. 4, the system 400 may be similar to the system 200 described and illustrated with reference to FIG. 2 except that, for example, a third compare module 406 and a third control module 408 replace the first compare module 206 and the first control module 208. The third compare module 406 may be configured to compare the signal quality of a signal measured by each of the plurality of infrastructure stations with a third threshold and provide a third result of comparison. The third control module 408 may be configured to update or renew the memory module 202 by adding an infrastructure station into the set of infrastructure stations if the signal quality measured by the each infrastructure station reaches the third threshold. That is, if the signal quality of a link between an infrastructure station and a mobile station is desirable, the infrastructure station associated with its channel condition may be added to the set of infrastructure stations in the memory module 202. Consequently, the set of infrastructure stations stored in the memory module 202 may have better channel conditions compared to the others of the plurality of infrastructure stations. The third threshold in one example may include one or more of a predetermined SINR, RSSI or BER value for an acceptable channel condition. Moreover, the memory module 202 may also store communication information such as timing information, synchronization information or transmission power of each of the infrastructure stations.

Figure 5:
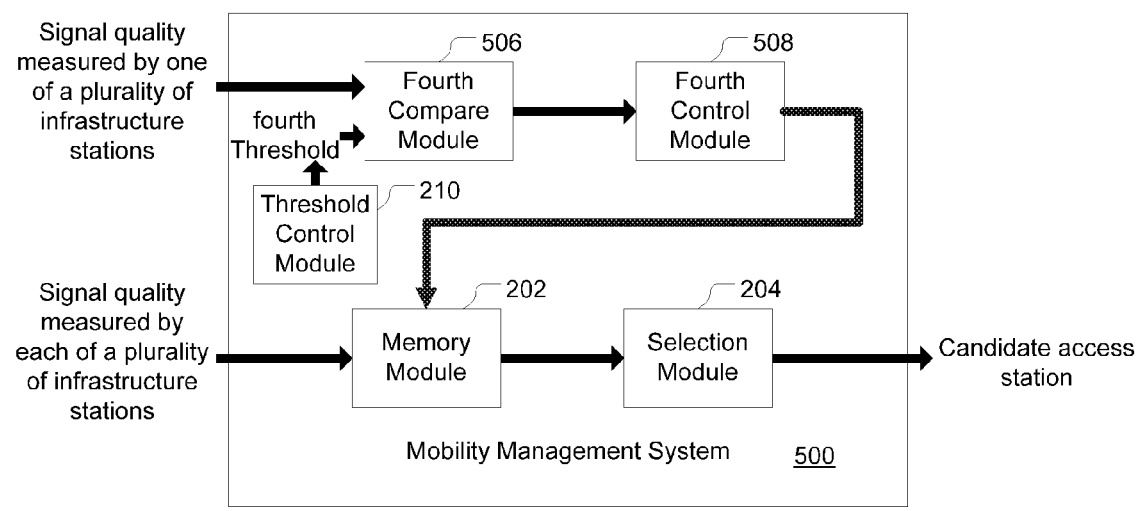
FIG. 5 is a diagram of a system for channel selection management according to yet another example of the present invention.

FIG. 5 is a diagram of a system 500 for channel selection management according to other example of the present invention. Referring to FIG. 5, the system 500 may be similar to the system 200 described and illustrated with reference to FIG. 2 except that, for example, a fourth compare module 506 and a fourth control module 508 replace the first compare module 206 and the first control module 208. The fourth compare module 506 may be configured to compare the signal quality of a signal measured by each of the set of infrastructure stations with a fourth threshold. The fourth control module 508 may be configured to update the memory module 202 by removing an infrastructure station from the set of infrastructure stations if the signal quality measured by the infrastructure station falls below the fourth threshold. That is, if the signal quality of a link between an infrastructure station and a mobile station is undesirable, the infrastructure station associated with its channel condition may be removed from the set of infrastructure stations in the memory module 202. Consequently, the set of infrastructure stations stored in the memory module 202 may have better channel conditions compared to the others of the plurality of infrastructure stations. The fourth threshold in one example may include one or more of a predetermined SINR, RSSI or BER value for an acceptable channel condition. Moreover, the memory module 202 may also store communication information such as timing information, synchronization information or transmission power of each of the infrastructure stations.

In the present example, if the first station currently serving the mobile station is removed, the selection module 204 may select a second station from the set of infrastructure stations in order to serve the mobile station. Moreover, if no such a second station can be found in the set of infrastructure stations, a handover for the mobile station may be performed to switch its connection from the current base station to another base station. In other examples, the system 500 may further include a threshold control module 510, which may be configured to provide one of the first threshold, the second threshold, the third threshold and the fourth threshold based on the input to the fourth compare module 506 to fit different kinds of applications.

Figure 6:
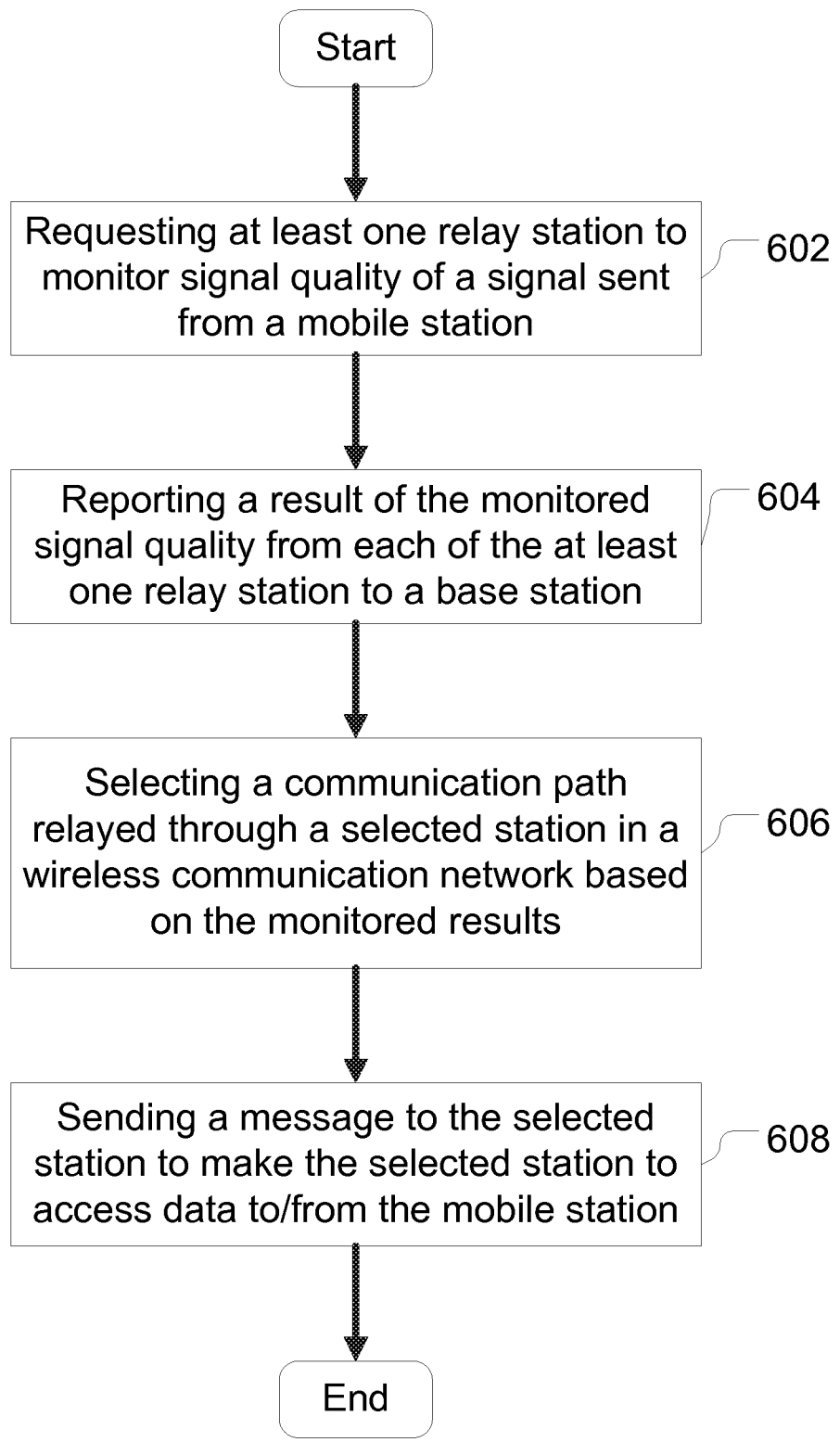
FIG. 6 is a flow diagram illustrating a method for channel selection management according to an example of the present invention.

FIG. 6 is a flow diagram illustrating a method of providing wireless communication according to an example of the present invention. Referring to FIG. 6, at step 602, at least one relay station may be requested by a base station to monitor the signal quality of a signal transmitted from a mobile station. In one example, the base station may send a request message to each of the at least one relay station over a first channel. At step 604, a message related to a result of the monitoring may be transmitted from each of the at least one relay station to the base station over a second channel, which may be the same as the first channel in one example. The message may indicate whether the signal quality of a communication path or a link between the each relay station and the mobile station is desirable.

Next, based on the message sent from each of the at least one relay station, a communication path related to one of the at least one relay station and the base station in a wireless communication network may be selected at step 606. That is, either one of the at least one relay station or the base station itself may be selected by, for example, the base station. Subsequently, the base station may assign the selected station to serve the mobile station at step 608. The second station may therefore be "transparent" to the mobile station. In one example, the selection of the communication path may be performed by identifying transmission parameters such as SINR, RSSI and BER.

Figure 7:
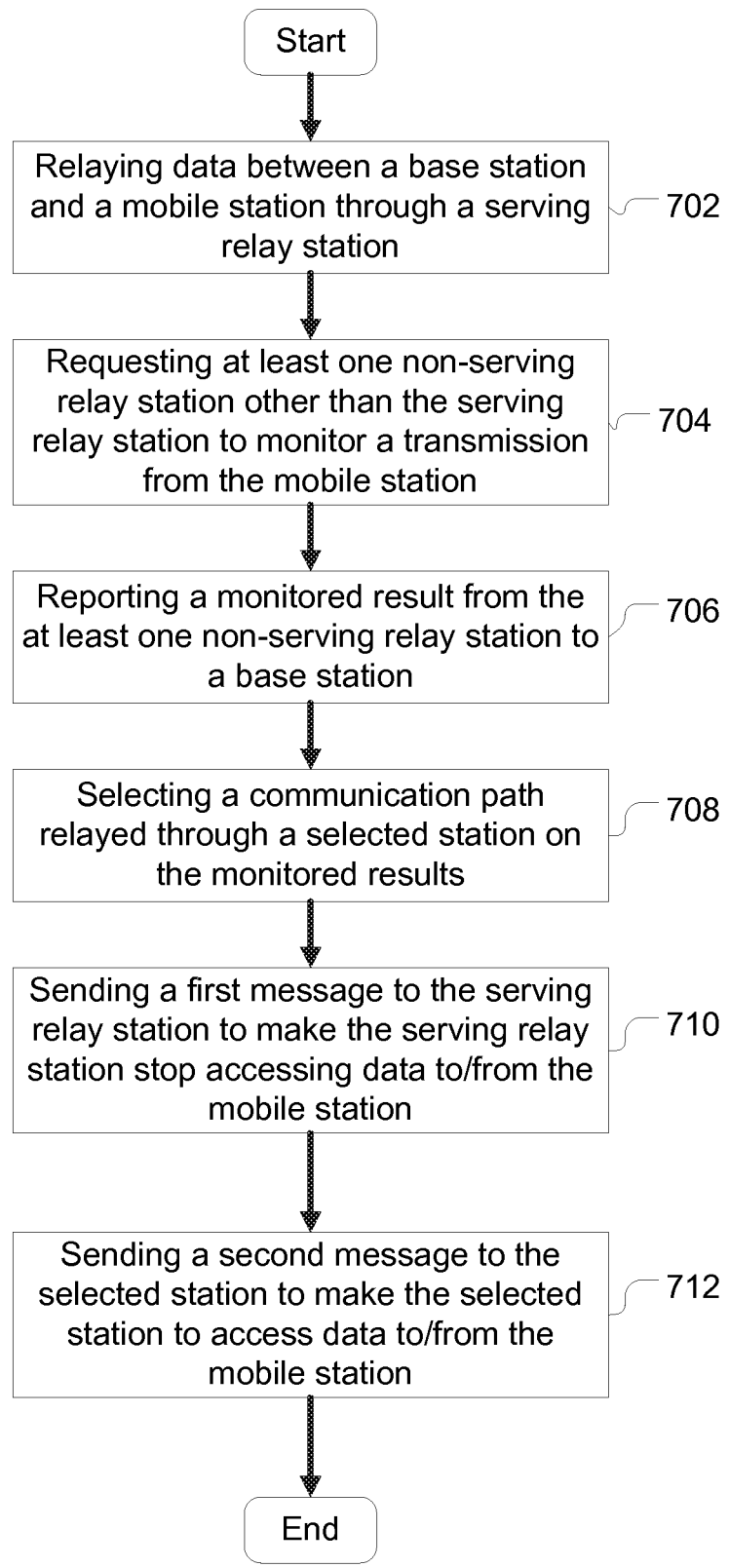
FIG. 7 is a flow diagram illustrating a method for channel selection management according to another example of the present invention.

FIG. 7 is a flow diagram illustrating a method of providing wireless communication according to another example of the present invention. Referring to FIG. 7, at step 702, data may be relayed between a base station and a mobile station through a serving relay station. At step 704, at least one non-serving relay station may be requested to monitor the signal quality of a signal transmitted from the mobile station. In one example, the base station may send a request message to each of the at least one non-serving relay station over a first channel. At step 706, a message related to a result of the monitoring may be transmitted from each of the at least one non-serving relay station to the base station over a second channel, which may be the same as the first channel in one example. Next, at step 708, based on the message sent from each of the at least one non-serving relay station, a communication path related to one of the at least one non-serving relay station may be selected. Then the serving relay station may be notified by, for example, the base station at step 710 to cease to serve the mobile station. Furthermore, the selected station may be notified by, for example, the base station at step 712 to serve the mobile station.

Figure 8:
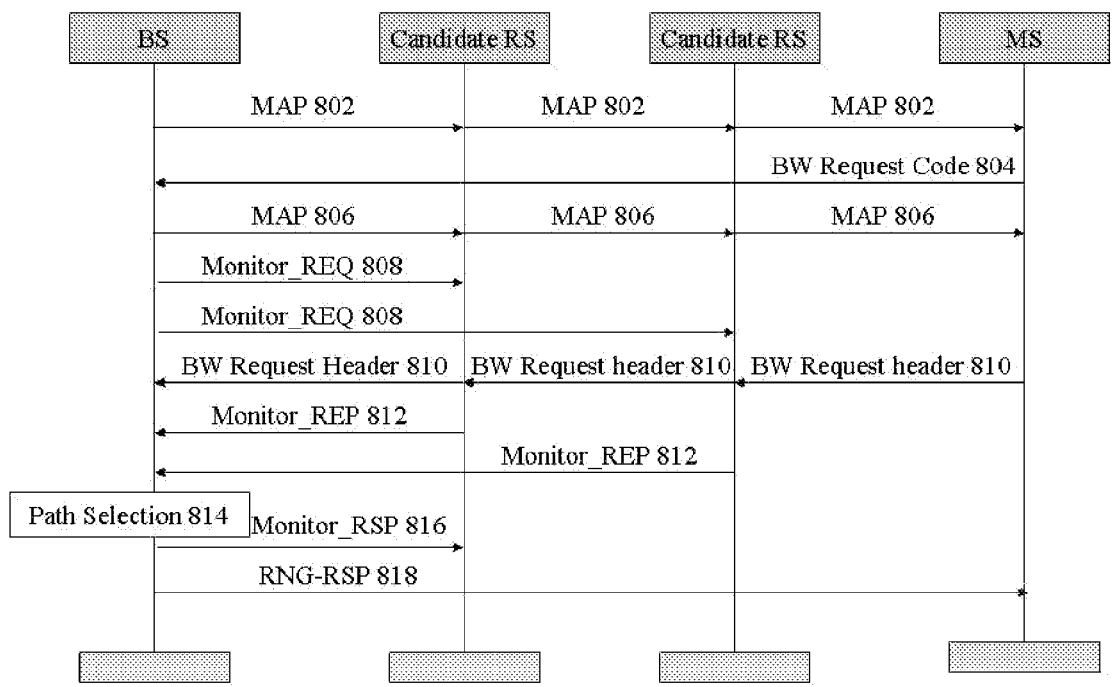
FIG. 8 is a message sequence flow illustrating signaling flow of a method for channel selection management according to an example of the present invention.

FIG. 8 is a message sequence chart illustrating signaling flow of a method for path selection and connection setup according to an example of the present invention. Referring FIG. 8, the signaling flow may concern wireless communications among a base station (BS), a first candidate relay station (RS), a second candidate relay station and a mobile station (MS). The BS may send a message (MAP) including resource allocation information to the first candidate RS, the second candidate RS and the MS at step 802. The MS may transmit a bandwidth (BW) request code to the BS for requesting channel bandwidth at step 804. At step 806, in response to the BW request code, the BS may send a new MAP including new resource allocation information to the RSs and the MS. Next, at step 808, the BS may send a message "Monitor_REQ," requesting its subordinate stations, i.e., the first candidate RS and the second candidate RS, to monitor the signal quality of a BW request header to be sent by the MS at step 810. The RSs may then each send a message "Monitor_REP" to the BS at step 812, reporting a result of the monitoring. The BS may make a path selection based on the messages "Monitor_REP" from its subordinate RSs by comparing communication performance or link status reported by the first candidate RS and the second candidate RS. In one example, the BS may select one of the RSs having better communication performance by, for example, using a predetermined threshold. The predetermined threshold may be similar to the first, second, third or fourth threshold previously discussed. At step 816, as in the present example shown in FIG. 8, the BS may select the first candidate RS as an access station (or target station) for the MS, and send a message "Monitor_RSP" as a response to the first candidate RS, requesting the first candidate RS to serve the MS. Subsequently, the BS may send a ranging response "RNG_RSP" at step 818 to start a ranging process with the MS. In response to the message "RNG_RSP", the MS may adjust its power for communication with the selected RS.

Figure 9:
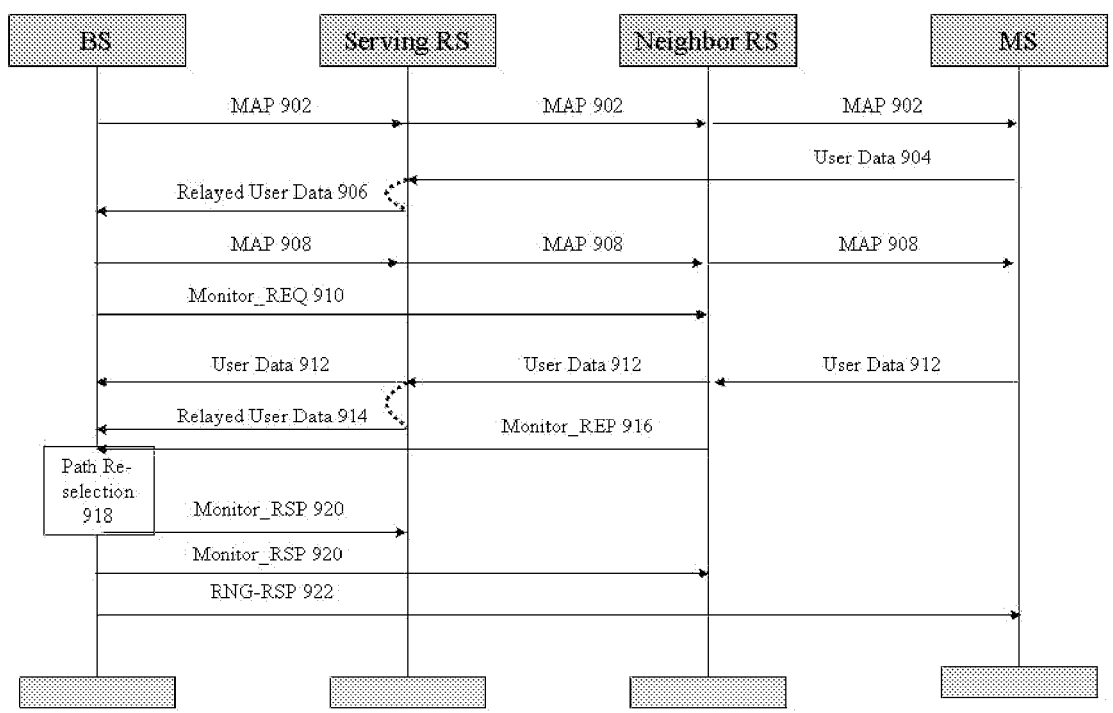
FIG. 9 is a message sequence flow illustrating signaling flow of a method for channel selection management according to another example of the present invention.

FIG. 9 is a message sequence chart illustrating signaling flow of a method for path re-selection and handover according to an example of the present invention. Referring to FIG. 9, the signaling flow may concern wireless communications among a base station (BS), a serving relay station (RS), a neighbor relay station and a mobile station (MS). The BS may send a message "MAP" including resource allocation information to the serving RS, the neighbor RS and the MS at step 902. Next, the MS may send user data to its access station, i.e., the serving RS at step 904. Then the user data may be relayed by the serving RS to the BS at step 906. Once the BS identifies that the signal quality of the relayed user data is undesirable, for example, falling below a predetermined threshold, the BS may select another access RS to serve the MS. Therefore, at step 908, the BS may send a new MAP including new resource allocation information to the RSs and the MS. And at step 910, the BS may send a message "Monitor_REQ" to request the non-serving RS, i.e., the neighbor RS, to monitor the signal quality of the user data sent by the MS to the neighbor RS. Next, user data from the MS may be sent to the RSs at step 912 and relayed to the BS at step 914. The neighbor RS may send a message "Monitor_REP," reporting a result of the monitoring to the BS at step 916. At step 918, the BS may perform a path re-selection based on the message "Monitor_REP." If the message "Monitor_REP" shows that the signal quality of the neighbor RS reaches a predetermined threshold, e.g., a minimum SINR or a minimum RSSI, or is better than that of the serving RS, the BS may send a message "Monitor_RSP" at step 920 to both the serving RS and the neighbor RS, requesting the serving RS to cease to serve the MS and the neighbor RS to start to serve the MS. Subsequently, the BS may send a ranging response "RNG_RSP" to the MS at step 922, indicating that the BS is ready to access new user data with the MS.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A system for channel selection management in a wireless communication network, the network including a plurality of infrastructure stations and a mobile station, wherein each of the plurality of infrastructure stations is configured to monitor a channel condition between itself and the mobile station, wherein the system is provided at a first one of the plurality of infrastructure stations, and wherein a second one of the plurality of infrastructure stations currently serves the mobile station, the system comprising:
    a memory module configured to store channel conditions between at least a subset of the infrastructure stations and the mobile station;
    a threshold control module configured to provide at least one threshold;
    a compare module configured to compare a channel condition corresponding to one of the plurality of infrastructure stations with the at least one threshold and to provide a signal for a comparison result;
    a control module configured to provide control information based on the signal from the compare module; and
    a selection module configured to select, based on the control information, one of the subset of infrastructure stations to serve the mobile station, wherein an assignment message is transmitted from the first one of the plurality of infrastructure stations to the selected infrastructure station based on the selection, and
    wherein:
    the threshold module provides a first threshold;
    the control module requests each of the plurality of infrastructure stations to report its corresponding channel condition;
    the compare module compares the reported channel condition of a third one of the plurality of infrastructure stations with the first threshold; and
    the control module adds the third one of the plurality of infrastructure stations into the subset of infrastructure stations if the reported channel condition of the third one of the plurality of infrastructure stations reaches the first threshold.

2. The system of claim 1, wherein the memory module includes a table storing the channel conditions of the subset of infrastructure stations.

3. The system of claim 1, wherein:
    the threshold control module further provides a second threshold;
    the compare module compares a channel condition of the second one of the plurality of infrastructure stations with the second threshold; and
    the control module provides control information to request each of the plurality of infrastructure stations to report its corresponding channel condition if the channel condition of the second one of the plurality of infrastructure stations falls below the second threshold.

4. The system of claim 3, wherein the control module is configured to update the channel condition of the second one of the plurality of infrastructure stations in the memory module if the channel condition of the second one of the plurality of infrastructure stations reaches the second threshold.

5. The system of claim 1, wherein:
    the threshold control module further provide a third threshold;
    the control module requests each of the plurality of infrastructure stations to report its corresponding channel condition;
    the compare module compares a channel condition of the second one of the plurality of infrastructure stations with the third threshold; and
    the control module provides control information to request each of the plurality of infrastructure stations to cease reporting its corresponding channel condition if the channel condition of the second one of the plurality of infrastructure stations reaches the third threshold.

6. The system of claim 1, wherein:
the threshold control module further provides a fourth threshold;
the control module requests each of the subset of infrastructure stations to report its corresponding channel condition;
the compare module compares the reported channel condition of a fourth one of the subset of infrastructure stations with the fourth threshold; and
the control module removes the fourth one of the subset of infrastructure stations from the subset if the reported channel condition of the fourth one of the subset of infrastructure stations falls below the fourth threshold.

7. A method for channel selection management in a wireless communication network, the network including a plurality of infrastructure stations and a mobile station, wherein each of the plurality of infrastructure stations is configured to monitor a channel condition between itself and the mobile station, wherein the method is implemented at a first one of the plurality of infrastructure stations, and wherein a second one of the plurality of infrastructure stations serves the mobile station, the method comprising:
storing channel conditions between at least a subset of the infrastructure stations and the mobile station;
providing at least one threshold;
comparing a channel condition corresponding to one of the plurality of infrastructure stations with the at least one threshold;
providing a signal for a comparison result;
providing control information based on the signal for the comparison result;
selecting, based on the control information, one of the subset of infrastructure stations to serve the mobile station, wherein an assignment message is transmitted from the first one of the plurality of infrastructure stations to the selected infrastructure station based on the selection, and
wherein the method further comprises:
providing a first threshold;
requesting each of the plurality of infrastructure stations to report its corresponding channel condition;
comparing the reported channel condition of a third one of the plurality of infrastructure stations with the first threshold; and
adding the third one of the plurality of infrastructure stations into the subset of infrastructure stations if the reported channel condition of the third one of the plurality of infrastructure stations reaches the first threshold.

8. The method of claim 7, further comprising storing the channel conditions of the subset of infrastructure stations in a table.

9. The method of claim 7, further comprising:
providing a second threshold;
comparing a channel condition of the second one of the plurality of infrastructure stations with the second threshold;
identifying that the channel condition of the second one of the plurality of infrastructure stations falls below the second threshold; and
providing a control information to request each of the plurality of infrastructure stations to report its corresponding channel condition.

10. The method of claim 7, further comprising:
providing a second threshold;
comparing a channel condition of the second one of the plurality of infrastructure stations with the second threshold;
identifying that the channel condition of the second one of the plurality of infrastructure stations reaches the second threshold; and
updating the stored channel condition of the second one of the plurality of infrastructure stations.

11. The method of claim 7, further comprising:
requesting each of the plurality of infrastructure stations to report its channel condition;
providing a third threshold;
comparing a channel condition of the second one of the plurality of infrastructure stations with the third threshold;
identifying that the channel condition of the second one of the plurality of infrastructure stations reaches the third threshold; and
providing control information to request each of the plurality of infrastructure stations to cease reporting its corresponding channel condition.

12. The method of claim 7, further comprising:
requesting each of the subset of infrastructure stations to report its corresponding channel condition;
providing a fourth threshold;
comparing a channel condition of a fourth one of the subset of infrastructure stations with the fourth threshold;
identifying that the reported channel condition of the fourth one of the subset of infrastructure stations falls below the fourth threshold; and
removing the fourth one of the subset of infrastructure stations from the subset.

13. The method of claim 7, wherein the plurality of infrastructure stations include at least one relay station and a base station, the method comprising:
requesting the relay station to monitor a channel condition of a channel between the relay station and the mobile station;
sending a message from the relay station to the base station to report a result of the monitoring;
identifying that the channel condition of the relay station is acceptable based on the message; and
selecting one of the relay station and the base station to serve the mobile station.

14. The method of claim 13, wherein selecting one of the relay station and the base station to serve the mobile station includes:
selecting the relay station; and
notifying the selected relay station to serve the mobile station.

15. The method of claim 14, further comprising requesting the mobile station to adjust at least one transmission parameter for communication with the selected relay station.

16. The method of claim 7, wherein the plurality of infrastructure stations include a first relay station serving the mobile station, a second relay station not serving the mobile station, and a base station, the method comprising:
reporting, by the first relay station, a channel condition between the first relay station and the mobile station;
requesting the second relay station not serving the mobile station to monitor a channel condition between the second relay station and the mobile station;
sending a message from the second relay station to the base station to report a result of the monitoring;

identifying the channel condition of the second relay station based on the message from the second relay station;

notifying the first relay station to cease serving the mobile station; and notifying the second relay station to serve the mobile station.

17. The method of claim 16, before requesting the second relay station, further comprising:

identifying that the channel condition of the first relay station falls below a predetermined threshold, the predetermined threshold including at least one of a minimum SINR, minimum RSSI or maximum BER.

18. The method of claim 16, before notifying the first relay station, further comprising:

identifying that the channel condition of the first relay station falls below a predetermined threshold.

19. The method of claim 16, before notifying the first relay station, further comprising:

identifying that the channel condition of the second relay station is better than that of the first relay station.

20. The method of claim 16, further comprising requesting the mobile station to adjust at least one transmission parameter for communication with the second relay station.

* * * * *

UNITED STATES PATENT AND TRADEMARK OFFICE
CERTIFICATE OF CORRECTION

PATENT NO. : 8,433,319 B2  
APPLICATION NO. : 11/970511  
DATED : April 30, 2013  
INVENTOR(S) : Ren et al.

Page 1 of 1

It is certified that error appears in the above-identified patent and that said Letters Patent is hereby corrected as shown below:

Title page, col. 1, under Item "(*) Notice," paragraph 2, delete "This patent is subject to a terminal disclaimer."

Signed and Sealed this  
Thirty-first Day of December, 2013

Margaret A. Focarino  
*Commissioner for Patents of the United States Patent and Trademark Office*